(12) United States Patent
Friedrich et al.

(10) Patent No.: US 11,149,793 B2
(45) Date of Patent: Oct. 19, 2021

(54) BEARING CAGE SEGMENT INCLUDING ALIGNMENT ELEMENT

(71) Applicant: AKTIEBOLAGET SKF, Gothenburg (SE)

(72) Inventors: Hans-Juergen Friedrich, Königsberg-Römershofen (DE); Norbert Huhn, Schweinfurt (DE); Thomas Kettner, Bamberg (DE); Manfred Mattes, Kolbingen (DE); Harald Metz, Randersacker (DE); Achim Mueller, Dittelbrunn (DE); Alfred Radina, Poppenlauer (DE); Jonas Schierling, Hassfurt (DE); Maximilian Soellner, Bundorf (DE); Markus Volkmuth, Werneck-Zeuzleben (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/778,035

(22) Filed: Jan. 31, 2020

(65) Prior Publication Data
US 2020/0256387 A1    Aug. 13, 2020

(30) Foreign Application Priority Data
Feb. 7, 2019    (DE) .......................... 102019201553.0

(51) Int. Cl.
*F16C 33/46*    (2006.01)
*F16C 33/54*    (2006.01)
*F16C 33/50*    (2006.01)

(52) U.S. Cl.
CPC ........ *F16C 33/467* (2013.01); *F16C 33/4694* (2013.01); *F16C 33/502* (2013.01);
(Continued)

(58) Field of Classification Search
CPC .... F16C 33/467; F16C 33/541; F16C 33/543; F16C 33/545; F16C 33/548;
(Continued)

(56) References Cited

U.S. PATENT DOCUMENTS 2,269,224 A    1/1942    Reilly
2,591,160 A    4/1952    Kilian
(Continued)

FOREIGN PATENT DOCUMENTS

CN    103415717 A    11/2013
CN    104475350 A     4/2015
(Continued)

OTHER PUBLICATIONS

Laserjob, Inc., Laser Material Processing, Oct. 2012, p. 2 (Year: 2012).

*Primary Examiner* — Marcus Charles
(74) *Attorney, Agent, or Firm* — J-Tek Law PLLC; Scott T. Wakeman; Mark A. Ussai

(57) ABSTRACT

A bearing cage segment of a sheet metal cage includes first and second sheet metal ring sections and bridges therebetween defining a plurality of pockets for receiving rolling elements. A first circumferential joint edge of the segment is configured to connect to a second circumferential joint edge of the segment or to a second joint edge of another segment, and the first joint edge includes at least one alignment element, such as a projection or contour, that is configured to align the first joint edge radially, axially and/or circumferentially against the second joint edge which may include a complementary alignment element such as a recess or complementary contour.

20 Claims, 3 Drawing Sheets

(52) U.S. Cl.
CPC .......... *F16C 33/541* (2013.01); *F16C 33/545* (2013.01); *F16C 33/548* (2013.01); *F16C 2220/60* (2013.01); *F16C 2226/36* (2013.01); *F16C 2226/70* (2013.01)

(58) Field of Classification Search
CPC .......... F16C 33/4694; F16C 33/502; F16C 2220/60; F16C 2226/36; F16C 2226/70; B31D 53/12; B21D 53/12
USPC .... 384/463, 572, 577, 579, 575; 29/898.067
See application file for complete search history.

(56) References Cited

U.S. PATENT DOCUMENTS

| | | | |
|---|---|---|---|
| 3,313,582 A | 4/1967 | Henry | |
| 3,353,246 A * | 11/1967 | Farmer | B21D 53/12 |
| | | | 29/898.067 |
| 3,356,428 A | 12/1967 | Ralph | |
| 3,473,857 A | 10/1969 | Pitner | |
| 3,605,247 A | 9/1971 | Bingle et al. | |
| 3,902,772 A | 9/1975 | Spate | |
| 4,397,507 A * | 8/1983 | Kraus | F16C 33/4635 |
| | | | 384/576 |
| 4,577,088 A | 3/1986 | Sharp | |
| 4,821,386 A | 4/1989 | Simon et al. | |
| 5,187,345 A | 2/1993 | Alling et al. | |
| 5,255,985 A | 10/1993 | Alling | |
| 5,528,706 A | 6/1996 | Harimoto et al. | |
| 6,330,748 B1 | 12/2001 | Müntnich et al. | |
| 6,752,535 B2 | 6/2004 | Krochak | |
| 6,883,968 B2 | 4/2005 | Fugel et al. | |
| 7,571,706 B2 | 8/2009 | Ichikawa et al. | |
| 8,696,210 B2 * | 4/2014 | Kawai | F16C 33/6651 |
| | | | 384/470 |
| 8,770,854 B2 | 7/2014 | Friedrich et al. | |
| 9,239,077 B2 * | 1/2016 | Doki-Thonon | F16C 33/467 |
| 9,382,947 B2 | 7/2016 | Ishibashi | |
| 9,429,194 B2 * | 8/2016 | Reimchen | F16C 33/502 |
| 9,512,881 B2 * | 12/2016 | Katayama | F16C 19/26 |
| 9,551,377 B2 | 1/2017 | Haas et al. | |
| 2007/0248298 A1 * | 10/2007 | Chihara | F16C 33/60 |
| | | | 384/579 |
| 2013/0034321 A1 * | 2/2013 | Beck | F16C 33/4694 |
| | | | 384/577 |
| 2013/0308890 A1 * | 11/2013 | Steblau | B21D 53/12 |
| | | | 384/577 |
| 2016/0017919 A1 * | 1/2016 | Haas | F16C 9/00 |
| | | | 384/572 |

FOREIGN PATENT DOCUMENTS

| | | | | |
|---|---|---|---|---|
| CN | 104847794 A | | 8/2015 | |
| CN | 104847795 A | | 8/2015 | |
| CN | 105605100 A | * | 5/2016 | ........... F16C 33/504 |
| CN | 106271725 A | * | 1/2017 | |
| CN | 206215979 U | * | 6/2017 | |
| CN | 107120357 A | * | 9/2017 | |
| DE | 2111081 A1 | | 9/1972 | |
| DE | 3130610 A1 | | 2/1983 | |
| DE | 19910928 A1 | * | 9/2000 | ........ B23K 15/0086 |
| DE | 10065169 A1 | * | 7/2002 | ............. F16C 33/41 |
| DE | 102006045436 A1 | * | 3/2008 | ........... F16C 33/502 |
| DE | 102009017751 A1 | | 10/2010 | |
| DE | 102016201052 A1 | * | 7/2017 | ........... F16C 33/541 |
| DE | 102016222336 A1 | * | 5/2018 | ........... F16C 33/545 |
| EP | 0074803 A1 | | 3/1983 | |
| EP | 2839175 B1 | * | 5/2016 | ........... F16C 33/543 |
| FR | 2234483 A1 | | 1/1975 | |
| FR | 2514440 A1 | * | 4/1983 | ......... F16C 33/4635 |
| FR | 2612102 A1 | | 9/1988 | |
| FR | 3013087 A1 | * | 5/2015 | ............. F16C 19/26 |
| GB | 1431612 A | | 4/1976 | |
| GB | 2103307 A | | 2/1983 | |
| JP | H0742744 A | * | 5/1995 | ......... F16C 33/4694 |
| JP | 07317773 A | * | 5/1997 | ......... F16C 33/4635 |
| JP | 2006064044 A | * | 6/2006 | ........... F16C 33/543 |
| JP | 2007247856 A | * | 7/2007 | ......... F16C 33/4694 |
| JP | 4786124 B2 | | 10/2011 | |
| JP | 2013007435 A | * | 3/2013 | ........... F16C 33/545 |
| JP | 2013108587 A | | 6/2013 | |
| JP | 2017026083 A | | 2/2017 | |
| JP | 6197844 B2 | | 9/2017 | |
| NL | 6910823 A | | 3/1970 | |
| WO | WO-2008040290 A1 | * | 4/2008 | ........... F16C 33/4611 |
| WO | 2014136816 A1 | | 9/2014 | |
| WO | 2015022355 A1 | | 2/2015 | |
| WO | WO-2018109784 A1 | * | 6/2018 | ............. F16C 19/48 |

* cited by examiner

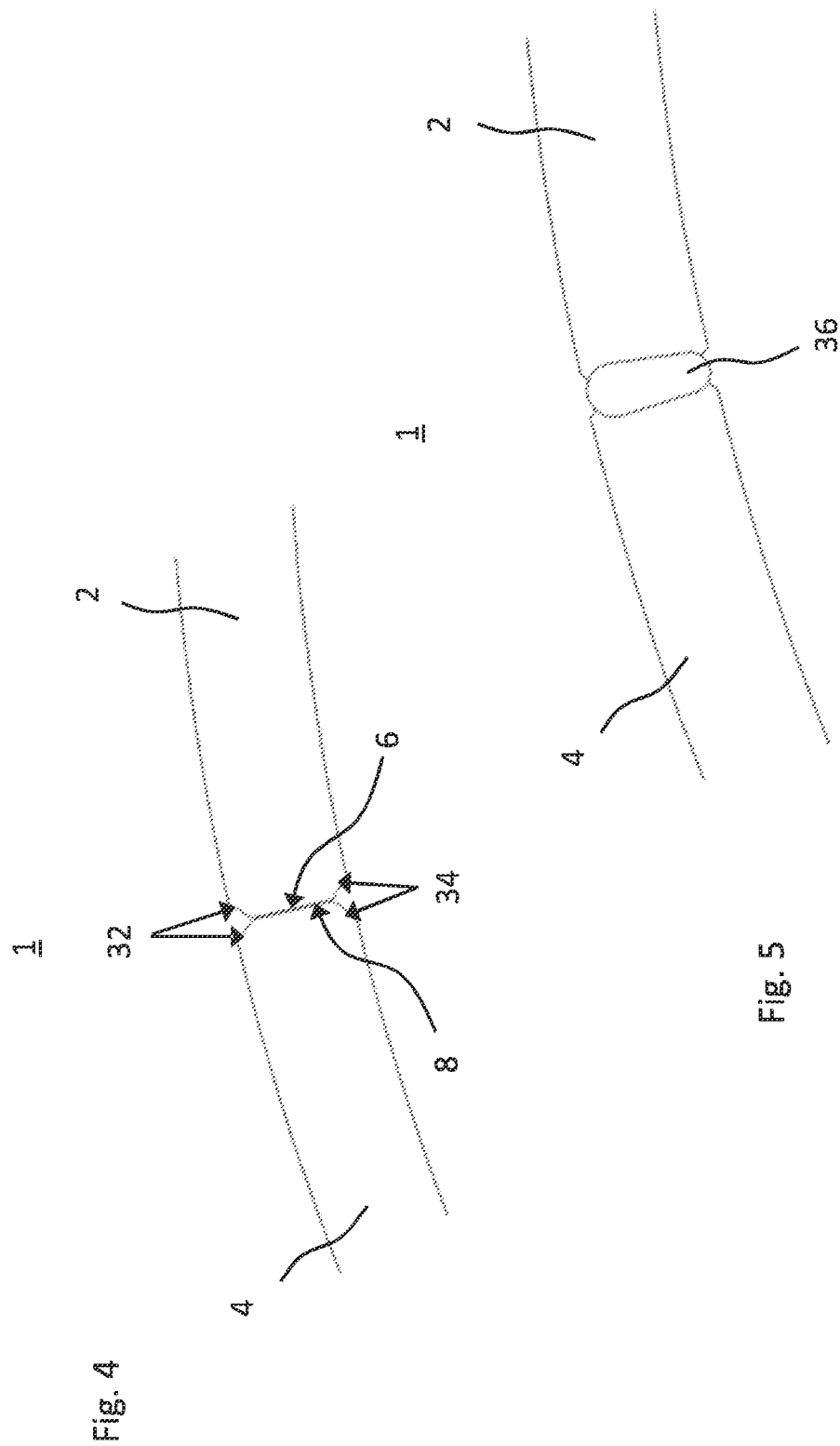

BEARING CAGE SEGMENT INCLUDING ALIGNMENT ELEMENT

CROSS-REFERENCE

This application claims priority to German patent application no. 10 2019 201 553.0 filed on Feb. 7, 2019, the contents of which are fully incorporated herein by reference.

TECHNOLOGICAL FIELD

The present disclosure is directed to a bearing cage segment of a sheet metal cage configured for ease of alignment and to a sheet metal cage including such a bearing cage segment.

BACKGROUND

Bearing cages are known from the prior art that are composed of one or more rounded cage segments, made of sheet metal, that are respectively connected to one another at their joint edges, for example by welding.

Here it is known to produce the structure and contour of such bearing cage segments by punching and stamping. For this purpose in a first step a metal band is intermittently moved along in the longitudinal direction, wherein transversely extending slots are formed by a punch press. In a further step the metal band is cut to length using a transverse cutting device so that a ladder-shaped sheet metal part is formed, wherein the "rungs" of this part form bridges of the bearing cage segment, the slots of the part form pockets of the bearing cage segment, and the "side rails" of the part form the ring sections of the bearing cage segment. In a subsequent step the ring sections are then bent to the desired radius of curvature by round-shaping.

Cutting to length is usually effected here in the region of a pocket so that a joint edge is formed on each of the ring sections and a "partial pocket" is formed therebetween. When assembling the bearing cage segment into the finished cage, these joint edges—after a post-processing, which is to be discussed in more detail below—are welded together with two further, analogously formed joint edges, so that a "welding pocket" is formed by the connecting of the "partial pockets."

However, during production of the weld connection there is the risk that the cage segments displace with respect to each other and are then no longer exactly aligned, so that they are offset with respect to each other in the connected state.

SUMMARY

It is therefore an aspect of the present disclosure to provide a bearing cage segment that is particularly suitable for producing an exact connection for forming a bearing cage.

In the following a bearing cage segment of a sheet metal cage, in particular for a needle roller bearing, is provided, which includes a first ring section, at least one second ring section, and a plurality of bridges connecting the first ring section and the at least one second ring section to each other, wherein a pocket for receiving at least one rolling element is respectively formed between the bridges. The bearing cage segment includes at least one first joint edge directed in the circumferential direction, which joint edge is configured to be connected to a second joint edge. As further preferred exemplary embodiments show, the second joint edge here can be disposed either on the same bearing cage segment or a second further bearing cage segment.

Here the disclosure is based on the idea that an alignment element is furthermore present that aligns the first joint edge radially, axially, and/or circumferentially against the second joint edge. Due to the alignment element the joint edges to be connected can be aligned in a precisely flush manner prior to the connection process, which can be, for example, a welding process. Consequently the risk can be avoided or at least significantly reduced that the joint edges are offset with respect to each other when they are connected.

Here the bearing cage segment can be configured for single-row or multi-row bearing cages.

According to a further exemplary embodiment, the first and the second joint edge each include at least one alignment element. The alignment accuracy can thereby be increased.

Furthermore an exemplary embodiment is preferred wherein the first and second alignment element of the first joint edge and the alignment element of the second joint edge are configured complementary to each other. The joint edges are thereby automatically aligned with respect to each other by the mutual engaging of the alignment elements.

Furthermore it is advantageous if the alignment element is configured such that a movement of the joint edges with respect to each other in the axial and/or radial direction is limited or prevented, so that the connection process can be facilitated and carried out more precisely. For example, the alignment element can include a first and a second section that extend by different distances circumferentially, whereby it is prevented that with contacting of the joint edges the first joint edge can be displaced with respect to the second joint edge. The risk is thereby practically precluded that the joint edges are not precisely aligned during welding.

Here it is particularly preferred that the alignment element has a dovetail shape, since an alignment and a movement restriction can thereby be achieved in the radial, axial, and circumferential direction.

According to a further exemplary embodiment, the at least one alignment element and/or the at least one joint edge is formed by laser cutting. The joint edge and/or the alignment element can be precisely manufactured by laser cutting. In addition the joint edge and/or the alignment element can be made directly suitable as welding edges. In this way a post-processing is not required for a reliable welding connection. In addition, due to the laser cutting the bearing cage segment can be individually manufactured, for example, by a cutting-out from a metal sheet. In this way the material loss as it occurs in the prior art can also be avoided. The manufacturing is thus made easier.

According to a further exemplary embodiment, the joint edge is disposed in the region of a bridge to be formed by the connection. In this way sufficient space is provided for forming the alignment elements on the joint edge, so that a precise alignment is possible. In addition, an overall enlarged connecting surface can be achieved on the bridge surface. This is advantageous because the stability of the connection can be increased due to the larger connecting surface. The bearing cage segment is therefore particularly suitable for producing a reliable connection for forming a bearing cage.

The pockets can subsequently be configured with larger axial extension so that longer rolling elements, that is, for example, longer needles, can be used. In this way the load capacity of a correspondingly formed bearing can be increased so that the bearing is suitable for supporting higher bearing forces. In addition—viewed normal to the circumferential direction—the cross-sections of the ring sections can also in principle be chosen smaller, whereby a corresponding material saving can be achieved.

Furthermore, no end-side partial pocket is formed in the region of the to-be-formed bridge by the design of the joint edge, so that the material loss of the "final pocket" given in the above-mentioned prior art can already be avoided.

Here it is furthermore advantageous if for the width b, measured in the circumferential direction, of a partial bridge for forming of the to-be-formed bridge it holds that: 0.5 d≤b≤d, wherein d is the width of the bridges measured in the circumferential direction. Due to this choice the to-be-formed bridge can exhibit sufficient stability for the welding connection with low material use.

Alternatively the joint edge and/or the alignment element can also be formed in the region of the pocket. This allows for a more rapid but nevertheless precise manufacturing, since a smaller surface needs to be welded.

According to a further preferred exemplary embodiment, at least one of the pockets is punched. The pockets can thereby be particularly suitably produced, since punching is a simple and rapid manufacturing process.

According to a further exemplary embodiment, the joint edge includes a chamfer on the radially outer side and/or the radially inner side. Due to this design it is made possible that during the producing of the welding connection no region forms projecting radially or axially over the respective ring section, in particular no projecting weld seam (so-called upper bead). A particularly simple manufacturing of the chamfer is made possible when it is formed by a reshaping process, i.e., for example, by a rolling or a milling.

According to a further aspect of the disclosure a sheet metal cage is provided, in particular for a needle roller bearing, that includes at least one of the above-described bearing cage segments. Here the at least one bearing cage segment or the plurality of bearing cage segments are connected at their joint edges via a material-bonded connection, in particular welded. The sheet metal cage can thus be manufactured particularly advantageously overall. A laser welding or an electrical resistance welding is particularly suitable here as welding. It can thus be achieved that the weld seam is particularly small. The sheet metal cage can be embodied single-row or multi-row.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 4 is a cross-sectional view of the bearing cage segments prior to their welding.

FIG. 5 is a representation corresponding to FIG. 4 after they are welded.

DETAILED DESCRIPTION

In the following, identical or functionally equivalent elements are designated by the same reference numbers. The direction designations used in the following—axial, radial, circumferential—always refer to the finished bearing cage.

Figure 1:
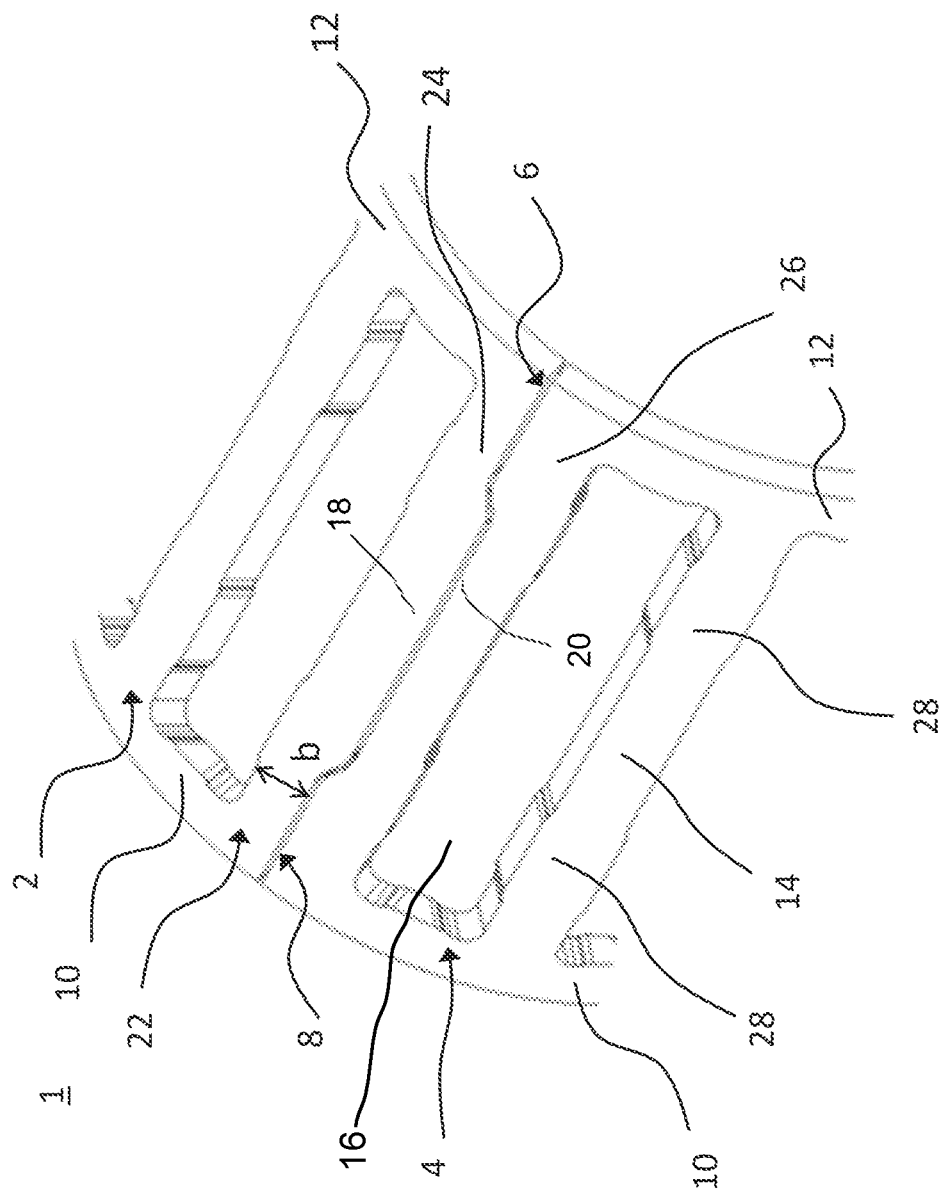
FIG. 1 is a perspective detail representation of a first exemplary embodiment of a bearing cage segment.

FIG. 1 shows a detail view of a first exemplary embodiment of a sheet metal cage including a first bearing cage segment 2 and a second bearing cage segment 4, which are respectively disposed abutting against each other at a joint edge 6, 8. Here instead of the first bearing cage segment 2 and a second bearing cage segment 4, also only a single bearing cage segment 2 can be provided that includes the joint edge 6 at a first end and the joint edge 8 at a second end.

For the sake of simplicity it is assumed here in the following that the metal cage includes at least two bearing cage segments 2, 4 that abut against each other.

Each bearing cage segment 2, 4 includes a first ring section 10 and a second ring section 12, and a plurality of bridges 14 connecting the first ring section 10 and the second ring section 12 to each other. Of course, instead of the bearing cage depicted single-row here, the bearing cage can be configured multi-row, and include more than two ring sections that are each connected to one another via bridges.

A pocket 16 for receiving at least one rolling element (not depicted) is respectively formed between the bridges 14. In the example shown the sheet metal cage is a needle-bearing cage, and the pockets 16 are each configured for receiving a needle-shaped rolling element.

As depicted, the bearing cage segments 2, 4 are connected to each other at their respective joint edges 6, 8 via a connection, in particular a material-bonded connection, such as, for example, a weld connection. Here a laser welding or an electrical resistance welding is suitable in particular for producing the connection.

In order to achieve an exact alignment of the joint edges 6, 8 or of the bearing cage segments 2, 4 with respect to each other, an alignment element 18, 20 is respectively provided on the first and the second joint edge 6, 8, which alignment elements 18, 20 are formed complementary to each other. In the exemplary embodiment depicted here, the alignment element 18 is formed via a projecting section of the first joint edge 6, which is received in an alignment element 20, configured complementary to the projecting section, in the form of a recessed section of the second joint edge 8. The bearing cage segments 2, 4 are thereby aligned with respect to each other at least in the axial direction. Furthermore, due to the design shown a movement is also restricted in the axial direction, so that it is ensured that the alignment of the bearing cage segments 2, 4 is also maintained during the production of the weld connection.

As furthermore depicted in FIG. 1, the joint edges 6, 8 are disposed in the region of a bridge 22 to be formed by this connection, here also referred to as "welding bridge" 22. Accordingly the first bearing cage segment 2 includes a first "partial bridge" 24 and the second bearing cage segment 4 includes a first "partial bridge" 26, wherein due to the connection of the corresponding joint edges 6, 8 these partial bridges 24, 26 form the to-be-formed bridge 22. Since the joint edges 6, 8 are formed in the region of the bridge 22, a particularly large contact or connecting surface can be achieved, and subsequently a particularly stable and reliable connection can be achieved. Here the partial bridges 24, 26 each preferably have a width b, measured in the circumferential direction, for which the following applies: $0.5\,d \leq b \leq d$ wherein d is the width of the "normal" bridges 14.

The joint edges 6, 8 are preferably formed by laser cutting. In this way the joint edges 6, 8 can be shaped so precisely that a post-processing for suitability as a welding surface is no longer required. Here the surface is directly cleaned by the laser cutting process. However, the pockets 16 can also be formed by a punching.

As can furthermore be seen from FIG. 1, guide surfaces 28 for guiding the rolling elements can also be formed on the bridges 14, also on the welding bridge 22, and on the ring sections 2, 4. These guide surfaces 28 can be formed, for example, during the punching of the pockets 16.

Figure 2:
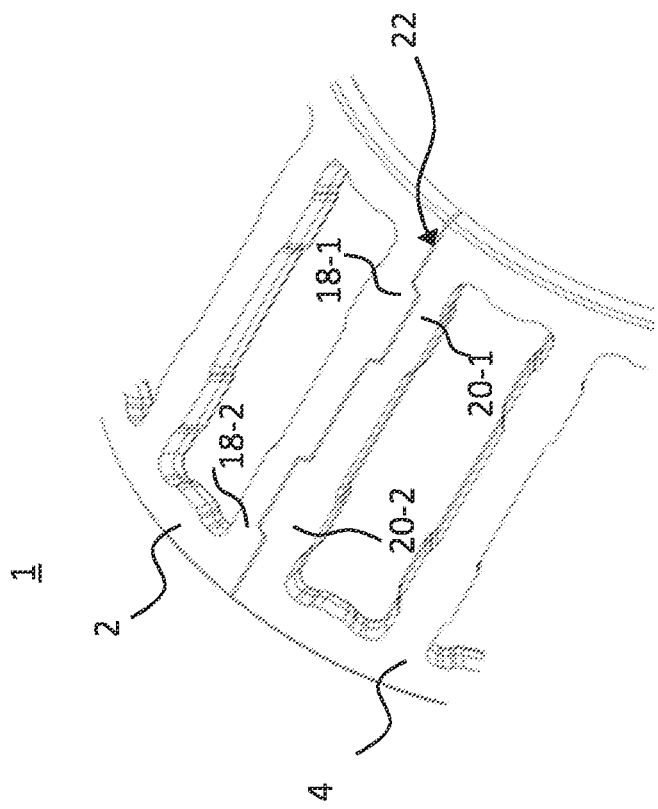
FIG. 2 is a perspective detail representation of a second exemplary embodiment of a bearing cage segment.

FIG. 2 shows a corresponding perspective representation of a second exemplary embodiment of a sheet metal cage 1, which, analogously to FIG. 1, is composed of two bearing cage segments 2, 4. Here also only a single bearing cage segment can instead be present that is only welded together at its ends. Here the joint edges 6, 8 are also disposed in the region of a to-be-formed bridge 22. Furthermore, not only one alignment element 18, 20 per joint edge is depicted here, but rather two alignment elements 18-1, 18-2, 20-1, 20-2, are provided per joint edge, wherein the alignment elements 18-1, 18-2 of the first bearing cage segment 2 in turn interact with alignment elements 20-1, 20-2 of the other bearing cage segment 4, which alignment elements are configured complementary to the alignment element 18-1, 18-2. Here the first joint edge 6 includes an alignment element 18-1 including a projecting section, and an alignment element 18-2 including a recessed section that engage into the respective complementarily configured alignment elements 20-1, 20-2 of the second joint edge 8. In this way a type of interlock is formed between the joint edges 6, 8.

Figure 3:
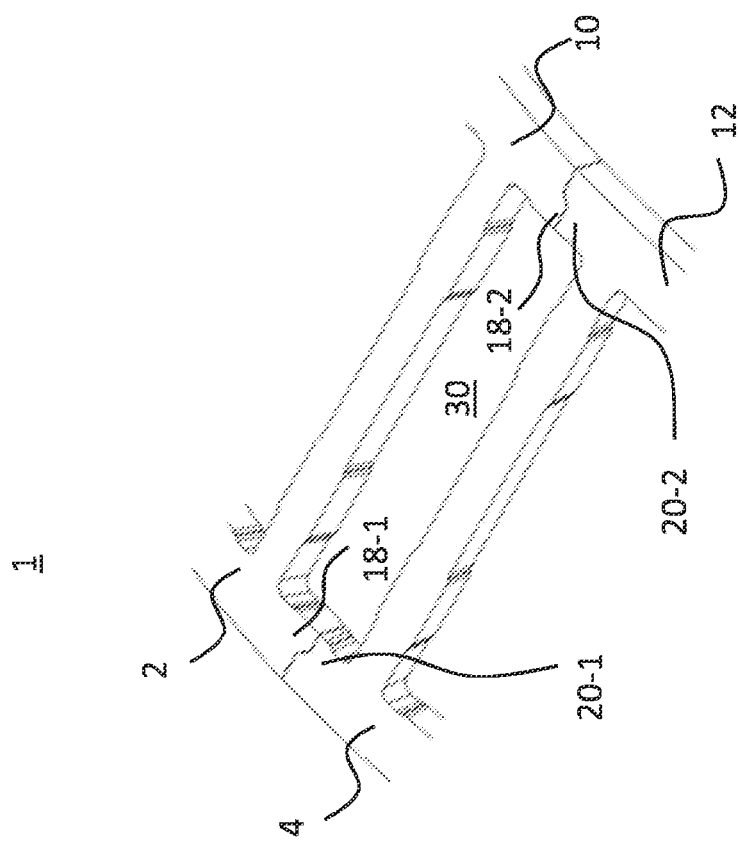
FIG. 3 is a perspective detail representation of a third exemplary embodiment of a bearing cage segment.

In the third exemplary embodiment shown in FIG. 3, the connection between the bearing cage segments 2, 4 is provided in the region of a to-be-formed pocket 30, and specifically on the ring sections 10, 12. Furthermore, here each bearing cage segment 2, 4 also includes at least one alignment element 18-1, 18-2, 20-1, 20-1, 20-2 in the connecting region, wherein in the exemplary embodiment depicted the respective alignment element 18-1, 18-2, 20-1, 20-2 is provided radially inward on the ring sections 10, 12. Also due to this design, the bearing cage segments 2, 4 are also aligned with respect to each other, and a movement is restricted at least in the axial direction.

FIGS. 4 and 5 show a further detail of the connection between the two bearing cage segments 2, 4. Thus the cross-sectional view of FIG. 4 shows the connection of the joint edges 6, 8 in a state wherein the joint edges 6, 8 in fact contact but are not yet welded. As can be seen from FIG. 4, each joint edge 6, 8 includes a first chamfer 32 on the radially outer side and a second chamfer 34 on the radially inner side. The chamfers 32, 34 serve to receive a radial or axial material accumulation, for example, an upper bead, as could arise due to the welding process. In FIG. 5 is shown in the state after the welding. The weld seam 36 formed by the welding can be seen here received in the space that the chamfers 32, 34 provide, so that no projections are formed.

The chamfers 32, 34 can preferably be produced by a reshaping, for example, a milling or rolling, wherein the laser cutting and the reshaping can be effected with the aid of one and the same machine. In order to form the chamfers 32, 34 the bearing cage segment 1 thereby need not be transported to a further tool.

In summary a bearing cage segment is provided that includes a joint edge that is configured to be connected to another joint edge. Here the joint edge includes an alignment element that serves on the one hand to align the joint edges with respect to each other and advantageously on the other can be configured to prevent a relative movement of the joint edges during material connecting (welding). It can thereby be ensured that the bearing cage segments 2, 4 are also precisely aligned with respect to each other after the welding.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide bearing cage segments.

Moreover, combinations of features and steps disclosed in the above detailed description may not be necessary to practice the invention in the broadest sense, and are instead taught merely to particularly describe representative examples of the invention.

Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Sheet metal cage
2 First bearing cage segment
4 Second bearing cage segment
6, 8 Joint edges
10 First ring section
12 Second ring section
14 Bridge
16 Pockets
18, 20 Alignment element
22 To-be-formed bridge
24, 26 Partial bridges
28 Guide surfaces
30 To-be-formed pocket
32 First chamfer
34 Second chamfer
36 Weld seam

What is claimed is:

1. A bearing cage segment of a sheet metal cage, comprising:
 a first sheet metal ring section,
 at least one second sheet metal ring section,
 a plurality of sheet metal bridges connecting the first ring section and the at least one second ring section to each other, and
 a pocket between adjacent pairs of the plurality of bridges configured to receive at least one rolling element, wherein the bearing cage segment includes a first joint edge directed in a first circumferential direction and a second joint edge directed in a second circumferential direction, the first joint edge being configured to connect to the second joint edge of the bearing cage segment or to a second joint edge of another bearing cage segment, wherein the bearing cage segment includes at least one alignment element that is configured to align the first joint edge radially, axially and/or circumferentially against the second joint edge, and wherein the at least one alignment element comprises a first alignment element on the first joint edge and a second alignment element on the second joint edge complementary to the first alignment element.

2. The bearing cage segment according to claim 1, wherein the at least one alignment element and/or the joint edge is formed by laser cutting.

3. The bearing cage segment according to claim 1, wherein the first joint edge is disposed in a to-be-formed bridge.

4. The bearing cage segment according to claim 1, wherein $0.5\ d \leq b \leq d$, where b is a circumferential width of a partial bridge for forming the to-be-formed bridge and d is a circumferential width of the plurality of bridges.

5. The bearing cage segment according to claim 1, wherein at least one of the pockets is punched.

6. The bearing cage segment according to claim 1, wherein the first joint edge includes a beveled edge on a radially outer side and/or on a radially inner side.

7. The bearing cage segment according to claim 6, wherein the beveled edge is reshaped by rolling or milling.

8. A sheet metal cage including at least one bearing cage segment according to claim 1, wherein the at least one bearing cage segment are connected at their joint edges via a material-bonded connection.

9. The sheet metal cage according to claim 8, wherein the material bonded connection is a laser welded connection or an electrical resistance welded connection.

10. The bearing cage segment according to claim 1, wherein the at first alignment element comprises a projection and the second alignment element comprises a recess.

11. The bearing cage segment according to claim 10, wherein the projection and/or the recess includes a beveled edge on a radially outer side and/or on a radially inner side.

12. The bearing cage segment according to claim 1, wherein the first alignment element comprises a contoured portion of the first joint edge.

13. The bearing cage segment according to claim 12, wherein the contoured portion includes a beveled edge on a radially outer side or a radially inner side.

14. The bearing cage segment according to claim 1, wherein the first joint edge is disposed at a to-be-formed pocket.

15. The bearing cage according to claim 1, wherein the first joint edge and the second joint edge each include a radially outer beveled edge and/or a radially inner beveled edge.

16. The bearing cage segment according to claim 1, wherein the at least one alignment element has laser-cut edges and the plurality of pockets have punched edges.

17. A sheet metal cage including at least one bearing cage segment, the at least one bearing cage segment comprising:
a first sheet metal ring section,
at least one second sheet metal ring section,
a plurality of sheet metal bridges connecting the first ring section and the at least one second ring section to each other, and
a pocket between adjacent pairs of the plurality of bridges configured to receive at least one rolling element,
wherein the bearing cage segment includes a first joint edge directed in a first circumferential direction and having a first alignment element and a second joint edge directed in a second circumferential direction and having a second alignment element complementary to the first alignment element,
wherein the first joint edge of the at least one bearing cage segment is materially bonded to the second joint edge of the at least one bearing cage segment.

18. The sheet metal cage according to claim 17, wherein the at least one bearing cage segment comprises a first bearing cage segment and a second bearing cage segment, and
wherein the first joint edge of the first bearing cage segment is materially bonded to the second joint edge of the second bearing cage segment.

19. The bearing cage segment according to claim 18, wherein the first joint edge is disposed at a to-be-formed pocket.

20. The bearing cage according to claim 18,
wherein the first joint edge and the second joint edge each include a radially outer beveled edge and/or a radially inner beveled edge.

* * * * *